US008818259B2

(12) United States Patent
Miao et al.

(10) Patent No.: US 8,818,259 B2
(45) Date of Patent: Aug. 26, 2014

(54) METHOD AND ARRANGEMENT IN A RADIO BASE STATION WORKING IN A PRE-CODING MODE FOR REPEATER SELECTION

(75) Inventors: Qingyu Miao, Beijing (CN); Lei Wan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 528 days.

(21) Appl. No.: 13/061,918

(22) PCT Filed: Sep. 5, 2008

(86) PCT No.: PCT/CN2008/001577
§ 371 (c)(1),
(2), (4) Date: Mar. 2, 2011

(87) PCT Pub. No.: WO2010/025585
PCT Pub. Date: Mar. 11, 2010

(65) Prior Publication Data
US 2011/0177823 A1    Jul. 21, 2011

(51) Int. Cl.
| H04B 3/36 | (2006.01) |
| H04B 7/14 | (2006.01) |
| H04B 1/00 | (2006.01) |
| H04B 1/04 | (2006.01) |
| H04M 1/00 | (2006.01) |
| H04W 48/20 | (2009.01) |
| H04B 7/155 | (2006.01) |
| H04B 7/26 | (2006.01) |
| H04W 84/04 | (2009.01) |

(52) U.S. Cl.
CPC ............ *H04B 7/2606* (2013.01); *H04W 84/047* (2013.01); *H04W 48/20* (2013.01); *H04B 7/155* (2013.01)
USPC .......... 455/7; 455/63.1; 455/114.1; 455/562.1

(58) Field of Classification Search
CPC .... H04B 7/2606; H04W 48/00; H04W 48/02; H04W 48/20; H04W 84/047
USPC ........ 455/7, 63.1, 78, 101, 114.2, 140, 277.1, 455/278.1, 296, 562.1
See application file for complete search history.

(56) References Cited

U.S. PATENT DOCUMENTS 5,519,381 A * 5/1996 Marsh et al. ................ 340/10.2
5,726,630 A * 3/1998 Marsh et al. ................ 340/10.2
(Continued)

FOREIGN PATENT DOCUMENTS

EP    1914947 A1    4/2008
JP    2008092433 A    4/2008
(Continued)

*Primary Examiner* — Wesley Kim
(74) *Attorney, Agent, or Firm* — Coats & Bennett, PLLC

(57) ABSTRACT

The present invention relates to methods and arrangements that enable easy integration of on/off repeaters in a radio access network and a minimized signaling for the UE repeater selection. This is achieved by a solution where the RBSs are working in a pre-coding mode and where the repeaters are measuring the downlink reference signals, selecting pre-coding matrices and feeding the index of selection back (i.e. the PMI) to the RBS, in analogy with what a UE does. This allows the RBS to distinguish the UE repeater selection, without introducing any extra uplink report or interaction between UEs and repeaters, by comparing the index from the UE with the indices from different repeaters.

10 Claims, 7 Drawing Sheets

(56) References Cited

U.S. PATENT DOCUMENTS

| | | | |
|---|---|---|---|
| 6,628,952 B1 * | 9/2003 | Hankins et al. | 455/446 |
| 7,062,224 B2 * | 6/2006 | Baker et al. | 455/9 |
| 7,912,141 B2 * | 3/2011 | She et al. | 375/267 |
| 2007/0281746 A1 * | 12/2007 | Takano et al. | 455/562.1 |
| 2010/0009625 A1 * | 1/2010 | Chami et al. | 455/11.1 |
| 2010/0215113 A1 * | 8/2010 | Lindgren et al. | 375/267 |

FOREIGN PATENT DOCUMENTS

| | | |
|---|---|---|
| KR | 20080070151 A | 7/2008 |
| RU | 2126165 C1 | 2/1999 |
| RU | 2315434 C2 | 1/2008 |

\* cited by examiner

METHOD AND ARRANGEMENT IN A RADIO BASE STATION WORKING IN A PRE-CODING MODE FOR REPEATER SELECTION

TECHNICAL FIELD

The present invention relates to the area of wireless communications, and especially to the use of on/off repeaters in a radio access network.

BACKGROUND

The Universal Mobile Telecommunication System (UMTS) is one of the third generation mobile communication technologies designed to succeed GSM. 3GPP Long Term Evolution (LTE) is a project within the 3$^{rd}$ Generation Partnership Project (3GPP) to improve the UMTS standard. UMTS Terrestrial Radio Access Network (UTRAN) is the radio access network of a UMTS system and evolved UTRAN (E-UTRAN) is the radio access network of an LTE system. The radio base station (RBS) in E-UTRAN is called evolved NodeB (eNB).

In radio access networks such as E-UTRAN, multiple-input and multiple-output (MIMO) is the name applied for the use of multiple antennas at both the transmitter and receiver to improve communication performance. MIMO can be subdivided into three main categories: pre-coding, spatial multiplexing, and diversity coding. Pre-coding is multi-layer beam-forming (i.e. shaping of the overall antenna beam in the direction of a target receiver) in a narrow sense or all spatial processing at the transmitter in a wide-sense. In conventional (i.e. single-layer) beam-forming, the same signal is emitted from each of the transmit antennas with appropriate phase (and sometimes gain) weighting such that the signal power is maximized at the receiver input. The benefits of beam-forming are to increase the signal gain from constructive combining and to reduce the fading effect. In the absence of scattering, beam-forming results in a well defined directional pattern. When the receiver has multiple antennas, the transmit beam-forming cannot simultaneously maximize the signal level at all of the receive antennas and pre-coding is thus used. With pre-coding, the multiple streams of the signals are emitted from the transmit antennas with independent and appropriate weighting per each antenna such that the link throughput is maximized at the receiver output. Applying different weights to the transmitted signals of the different antennas can be expressed as applying a pre-coding vector to the transmitted signals. Pre-coder based spatial multiplexing can be seen as a generalization of pre-coder based beam forming with the pre-coding vector replaced by a pre-coding matrix. Hereinafter, the term pre-coding matrix will be used. The receiver estimates the channel and decides on a suitable pre-coding matrix from the code-book (containing the set of available pre-coding matrices), and feeds back the information about the selected pre-coding matrix to the transmitter.

FIG. 1 illustrates schematically a part of the radio access network in an LTE system (E-UTRAN). Based on measurements of the downlink reference signals of the different eNB antennas, the user equipment (UE) 150 decides on a suitable pre-coding matrix from the code-book corresponding to a certain beam 120. The index of the selected vector is reported to the eNB 110, and the eNB 110 can use this pre-coding matrix for the downlink transmission to the UE 150. In LTE the vector index is called Pre-coding Matrix Index (PMI).

Future radio access networks are expected, apart from many other aspects, to either require increased coverage, support of higher data rates or a combination of both. Increasing the network capacity may sometimes lead to a decreased coverage, but the usage of relays or repeaters is a good option for challenging the trade-off between the transmission range (coverage) and the end-to-end data range. The benefit of relays and repeaters stems from the fact that splitting a long distance into two roughly equidistant hops allows for an increased data rate.

Compared to relays, Radio Frequency (RF) repeaters are much simpler and thus cost less. An RF repeater (hereafter called just repeater) is a combination of a radio receiver and a radio transmitter that receives a weak or low-level signal and retransmits it at a higher level or higher power, so that the signal can cover longer distances without degradation. They are suitable e.g. for extending coverage in a rural or suburban area. A feature that defines the repeater is that it receives, amplifies and retransmits the signal almost simultaneously.

FIG. 2 illustrates a cell 200 in an E-UTRAN with an eNB 210 and three repeaters 230a-c. The repeaters 230a-c amplify and retransmit the signals they receive from the eNB 210 and the UE 250. Remarkable coverage expansion can be achieved by employing many repeaters. However, a repeater amplifies both the received signal and the interference, which results in a higher inter-cell inference. With the use of on/off repeaters the inter-cell interference can be decreased. An on/off repeater is turned off (that is the retransmission of signals is turned off) when there are no UEs scheduled for transmission in its repeater area, and it does thereby not contribute to the interference. To control the on and off state of the repeaters, an RBS has to distinguish the repeater selection for each UE, i.e. which one of the repeaters that the UE is using for its communication. Based on the repeater selection of the different active UEs, the RBS can make decisions on what repeaters to turn off jointly with the scheduling decisions. Traditionally, the UE measures the reference signals from the repeaters, selects a preferred repeater based on these signals and feeds back the selected repeater index to the RBS via the repeater. The problem with this solution is that an extra uplink report is needed for this feedback, and that interaction signaling between repeaters and UEs is needed as well. This makes the integration of repeaters to existing networks complicated, and it also increases the signaling overhead.

SUMMARY

The object of the present invention is to achieve methods and arrangements that obviate some of the above drawbacks and enable easy integration of on/off repeaters in a radio access network and a minimized signaling for the UE repeater selection. This is achieved by a solution where the RBSs are working in a pre-coding mode and where the repeaters are measuring the downlink reference signals, selecting pre-coding matrices and feeding the index of selection back (i.e. the PMI) to the RBS, in analogy with what a UE does. This allows the RBS to distinguish the UE repeater selection, without introducing any extra uplink report or interaction between UEs and repeaters, by comparing the index from the UE with the indices from different repeaters.

Thus in accordance with a first aspect of the present invention, a method for repeater selection for a RBS working in a pre-coding mode in a radio access network is provided. The RBS is using one or more repeaters and is serving at least one UE. The method comprises the step of broadcasting reference signals. It also comprises the steps of receiving a pre-coding matrix index from the repeaters, and storing them. It further comprises the steps of receiving a pre-coding matrix index from the UE, and of comparing the received index from the UE, with the stored indices from the repeaters. When a stored index from a repeater matches the received index from the UE, the method also comprises the step of determining the repeater that corresponds to this matching stored index as a repeater selection of the UE.

In accordance with a second aspect of the present invention, a method for repeater selection for a repeater in a radio access network is provided. The repeater is used by a RBS working in a pre-coding mode. The method comprises the steps of measuring reference signals from the RBS, and selecting a pre-coding matrix based on the measured reference signals. It further comprises the step of transmitting an index of the selected pre-coding matrix to the RBS. The index is used by the RBS to determine the repeater selection for a user equipment.

In accordance with a third aspect of the present invention, a RBS of a radio access network is provided. The RBS is adapted to work in a pre-coding mode and to use at least one repeater. It is also adapted to serve one or more UEs. The RBS comprises means for broadcasting reference signals. It also comprises means for receiving and storing a pre-coding matrix index from the repeaters. It further comprises means for receiving a pre-coding matrix index from the UE, and means for comparing the received index from the UE with the stored indices from the repeaters, to find a repeater with a matching stored index. Furthermore it comprises means for determining the repeater that corresponds to the matching stored index as a repeater selection of the UE.

In accordance with a fourth aspect of the present invention, a repeater of a radio access network, adapted to be used by a RBS working in a pre-coding mode, is provided. It comprises means for measuring reference signals from the RBS. It also comprises means for selecting a pre-coding matrix based on the measured reference signals, and means for transmitting an index of the selected pre-coding matrix to the RBS. The index is used by the RBS to determine the repeater selection for a user equipment.

An advantage of embodiments of the present invention is that the RBS can detect the UE repeater selection in an efficient way, without the need of any extra uplink report or interaction between UEs and repeaters. The RBS can thus determine the UE selection for an efficient control of on/off repeaters with minimal signaling overhead.

Another advantage of embodiments of the present invention is that they enable an easy introduction of new repeaters in an existing radio access network, as modifications of the pre-coding code books are avoided. Furthermore, the repeater doesn't need to transmit any reference signals since the UE and the RBS don't need to detect the channel information from the repeaters.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to a E-UTRAN. It should though be noted that the invention and its exemplary embodiments may also be applied to other types of radio access technologies with similar characteristics to E-UTRAN in terms of the eNB pre-coding mode and PMI reporting.

Embodiments herein enable easy introduction of on/off repeaters and an efficient UE repeater selection with minimal signaling overhead. Embodiments herein can be implemented in a radio access network with eNBs working in a pre-coding mode using on/off repeaters for increased coverage. In such a network, the eNB broadcasts the reference signals from its transmitting antennas and the repeaters receive these signals and retransmit them to the UE. The UE measures the reference signal from the eNB, estimates the channel, selects a preferred beam or pre-coding matrix and feeds the index of the pre-coding matrix (the so called PMI) back to the eNB.

Figure 1:
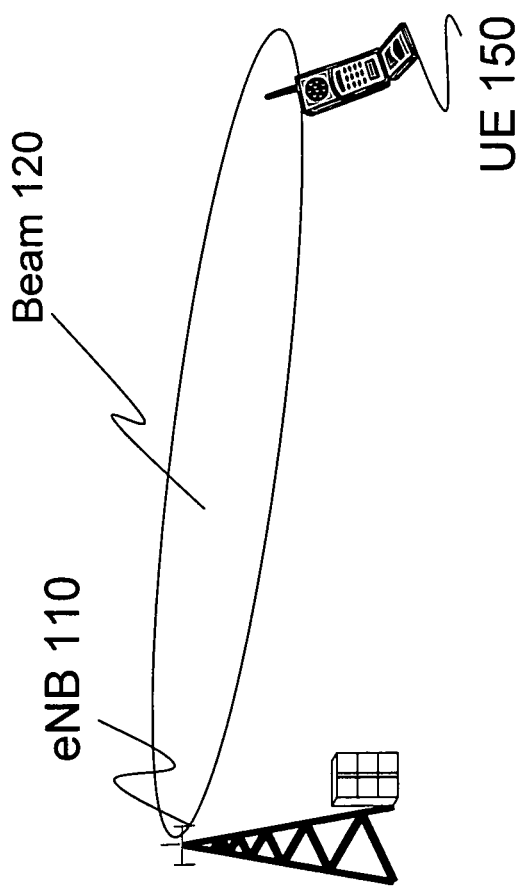
FIG. 1 illustrates schematically a part of a E-UTRAN with an eNB working in a pre-coding mode.
Figure 2:
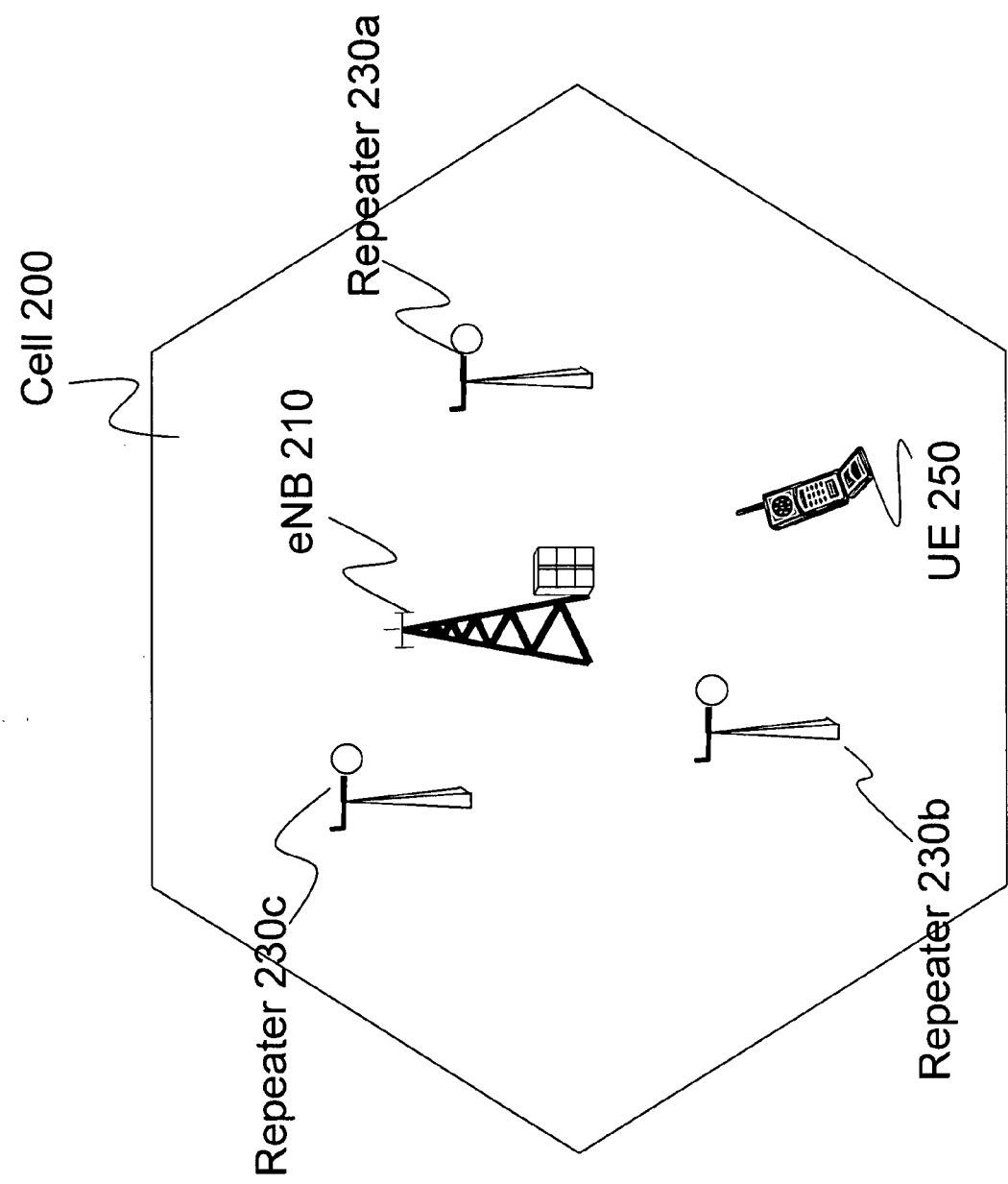
FIG. 2 illustrates schematically a part of a E-UTRAN with an eNB and its repeaters, wherein the present invention may be implemented.
Figure 3:
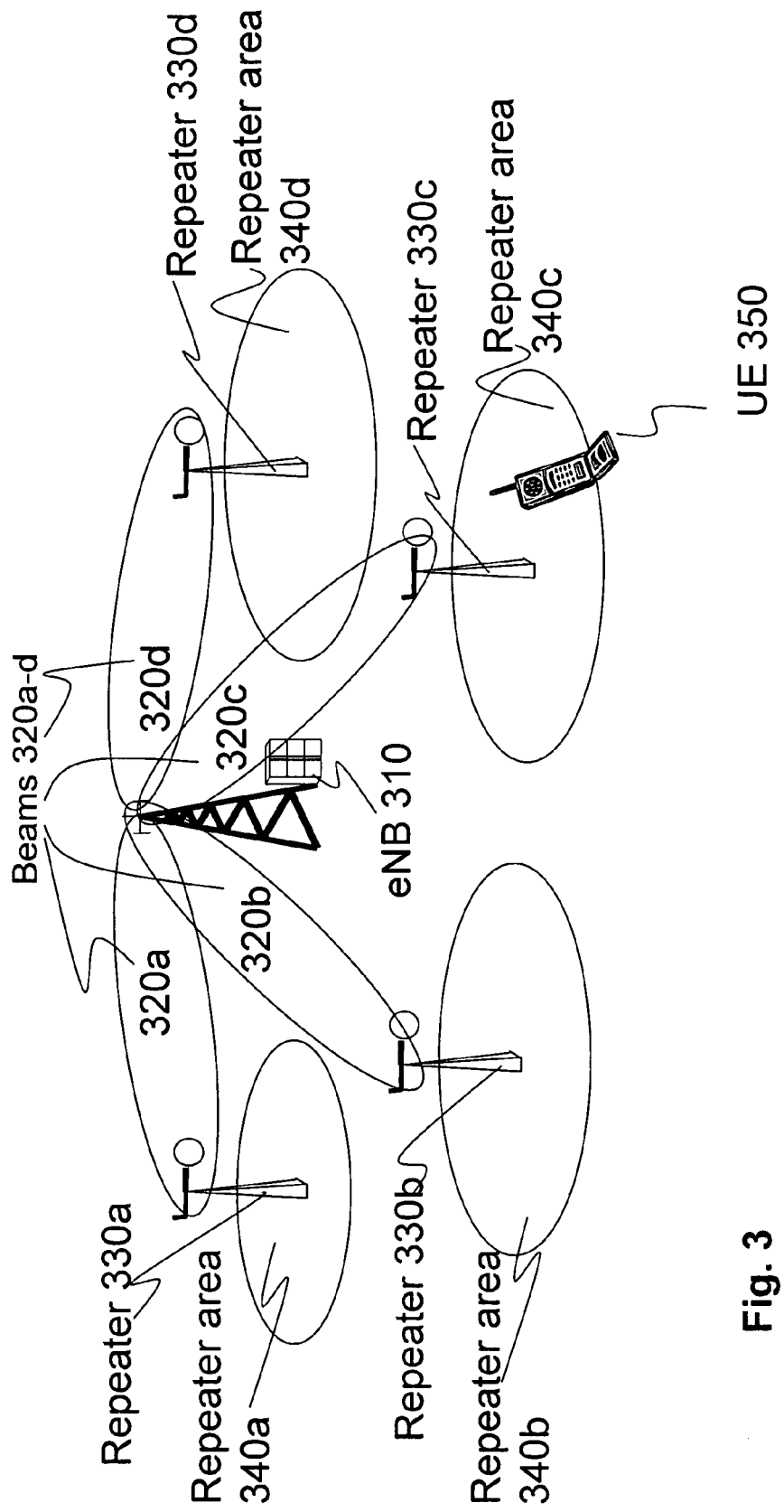
FIG. 3 illustrates schematically a radio site in E-UTRAN with an eNB working in a pre-coding mode and its repeaters, according to embodiments of the present invention.

In order to minimize the interference in the network, the eNB makes the repeater on/off decisions simultaneously with the scheduling decisions. The control of the repeaters requires the knowledge of the repeater selection for each UE. The following describes how the eNB determines the repeater selection in the present invention, with reference to FIG. 3.

By taking advantage of the spatial divisional effect of pre-coding (or beam-forming) mode, different repeaters 330a-d serving a UE 350 in the repeater areas 340a-d, can be covered by different beams 320a-d (corresponding to pre-coding matrices) from the eNB 310. In one embodiment of the present invention, each repeater will measure the reference signals from the eNB instead of just retransmitting them as in prior art, and will then, based on the measurement, select a pre-coding matrix from the code-book and transmit the index of the selected pre-code vector (the PMI) to the eNB (in analogy with what a UE does).

The eNB receives and stores the PMI transmitted from the repeater. The repeater PMI is the repeater index at the eNB and is used when determining the UE repeater selection.

Each time the eNB receives PMI feedback from a UE, the UE PMI is compared with all the stored repeater's PMI, i.e. the repeater indices. When there is a match between a repeater index and the UE PMI, the eNB can determine the corresponding repeater as being the preferred repeater for that specific UE. For example, and with reference to FIG. 3, if a repeater 330c selects a specific beam (or pre-coding matrix) 320c and a UE 350 selects the same beam 320c, then this UE 350 has implicitly selected to be served by that repeater 330c. The repeater selection is thus done without any extra report from the UE to the eNB, and without any extra interaction between UE and repeater. Another advantage is that an introduction of new on/off repeaters in an existing network might not require any modifications of the already defined pre-coding code-books.

In order to assure a correct repeater selection in the present invention, it's important to make sure that there is a one-to-one mapping between pre-coding matrices and repeaters. This is obtained with a correct dimensioning and planning of the network, where the number of repeaters and the repeater positions need to be selected with care. Furthermore, if the antenna distance in eNB is small, there is a mutual antenna correlation between the antennas and there will be a good mapping between the repeaters position and the PMI.

High mutual antenna correlation typically implies an antenna configuration with a small inter-antenna distance (fraction of a wavelength) while low mutual antenna correlation implies a sufficiently large antenna distance (several wave lengths). In the case of low mutual antenna correlation, updates to the pre-coding matrix is typically done on a relatively short time scale to capture the fading variations. High mutual antenna correlation is preferable in the present invention as it give a stable relationship between the PMI and the beam direction.

In one embodiment of the invention the repeater's PMI reporting is done in a static way, once at system initialization. This is possible if the PMI is stable, i.e. that it doesn't vary over time, which is the case with high mutual antenna correlation thanks to closely spaced antenna arrays. The repeaters PMI value can then be stored once and used for all the UE repeater selections thereafter.

In an alternative embodiment of the present invention the repeater's PMI reporting is done dynamically, each time the repeaters PMI has changed. This is the case of low mutual antenna correlation in a network with antennas with large spacing.

In further embodiments of the present invention the repeater selection is used by the eNB when controlling the turning on and off of the different repeaters. In order to minimize the interference, the repeater is turned on only when the users within the repeater area is scheduled at a certain time or in certain frequency resources.

Figure 4:
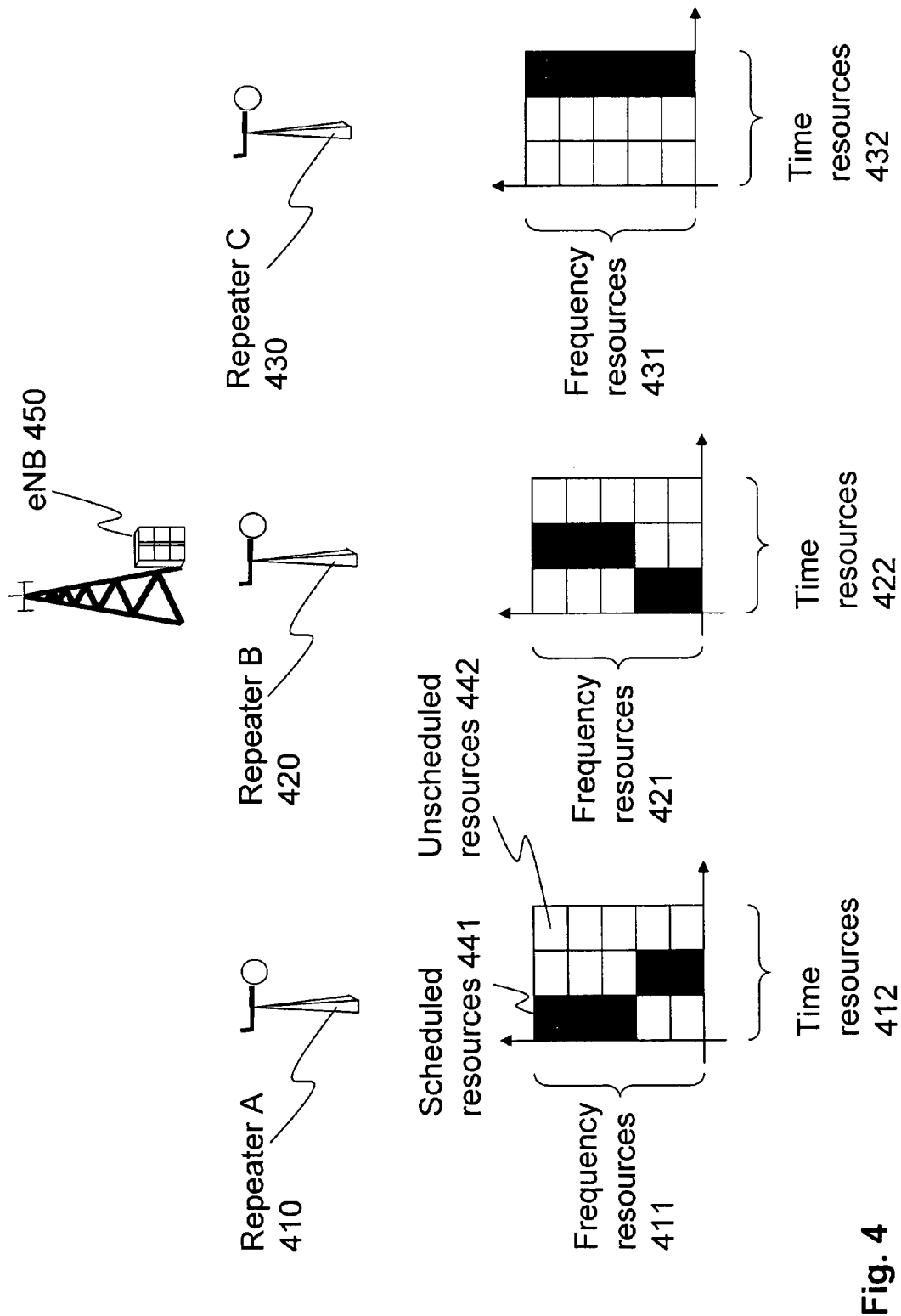
FIG. 4 illustrates schematically an eNB with its repeaters and the scheduling of resources for each repeater.

An example of this is schematically illustrated in FIG. 4, where an eNB 450 has three repeaters—repeater A 410, B 420 and C 430—with corresponding frequency 411, 421, 431 and time resources 412, 422, 432, scheduled 441 or unscheduled 442 for the different UEs in their corresponding repeater areas. In this example, UEs in the area of repeater A 410 and repeater B 420 are scheduled at the same time during the first two time resources (e.g. sub frames) but in different frequency resources, whereas no UEs in the area of repeater C 430 are scheduled at the same time. Repeater C 430 can thus be turned off during these first two sub frames, while repeater A 410 and repeater B 420 can be turned off and on in the frequency domain in accordance with their scheduled frequency resources. During the third time resource, UEs in the area of repeater C 430 has scheduled resources, while no UEs are scheduled in the areas of repeater A 410 and B 420. Repeater C 430 is thus turned on again and repeater A 410 and B 420 are turned off.

The turning off and on of the repeaters controlled by the eNB, can be implemented in different ways. In one first embodiment of the present invention, the eNB can control the repeaters by transmitting on/off commands to the repeaters via in-band or out-band signaling, based on the UE repeater selection and the scheduling decisions.

A second embodiment requires repeaters that turn off automatically when the received power of the signals is lower than a certain threshold. If the repeater keeps a fixed amplifier gain within the dynamic range, the eNB can control the switching on/off of the repeater by its scheduling behavior, e.g. by scheduling resources in a controlled way in the time domain. The inter-repeater interference is limited, even when the received interference level is higher than the threshold, thanks to the fixed amplifier gain of the repeater.

In a third embodiment, the solution of the previous second embodiment can be expanded to the frequency domain, if the repeater is capable to detect the received power level in the sub-bands and automatically turn off those with low received power. In this case the eNB can schedule different frequency resources to different beams depending on the interference levels, and thereby control the interference.

Figure 5:
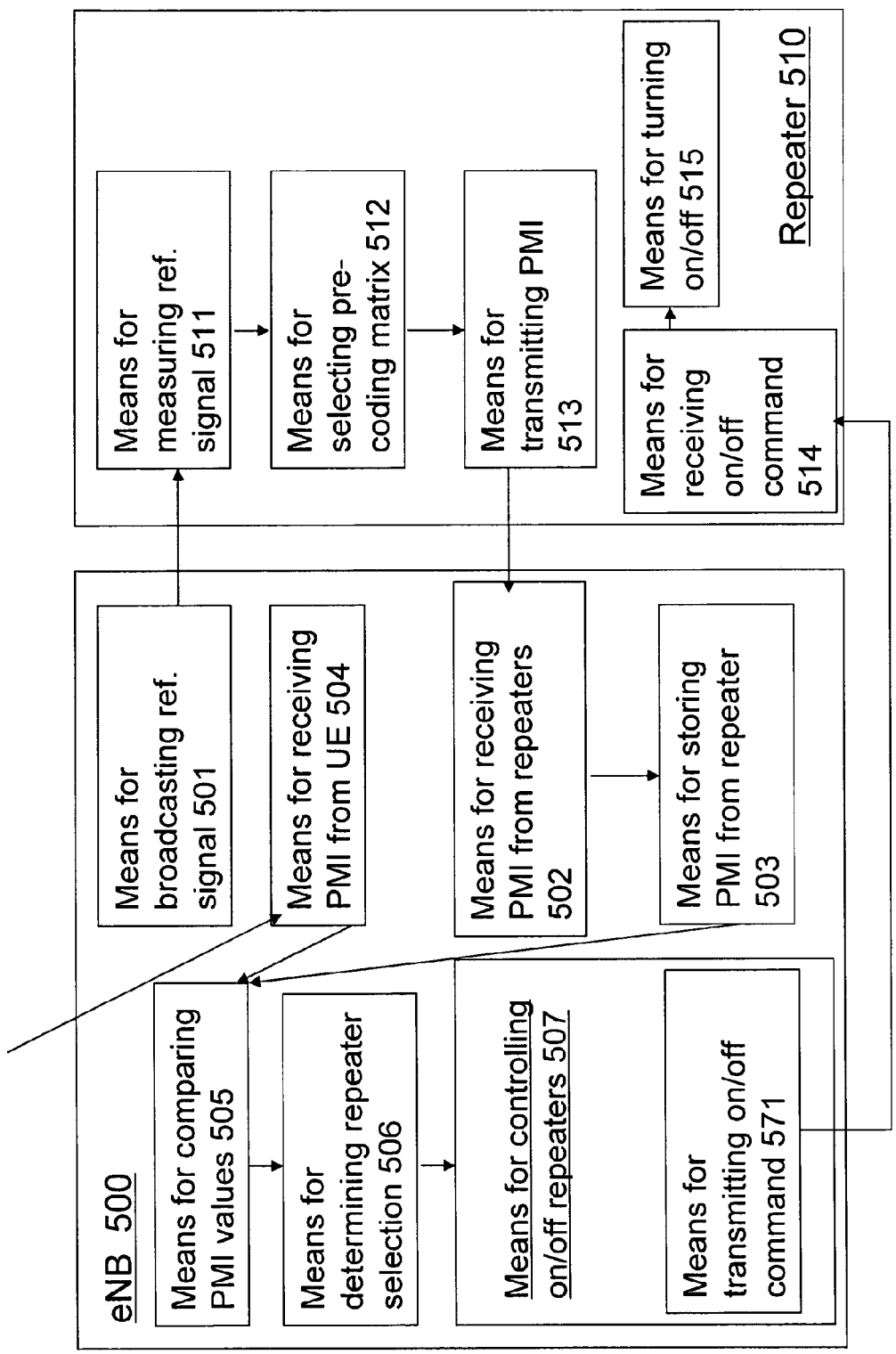
FIG. 5 illustrates schematically an eNB and a repeater according to embodiments of the present invention.

Schematically illustrated in FIG. 5 and according to the first embodiment above, is the eNB 500. It comprises means for broadcasting 501 reference signals to be used by the repeaters as well as the UEs for selecting the pre-coding matrix. It also comprises means for receiving 502 a PMI from the repeaters and means for storing 503 the PMI. Furthermore it comprises means for receiving 504 a PMI from a UE and means for comparing 505 this UE PMI with the stored indices form the repeaters. This is done to find a repeater with a matching PMI. It also comprises means for determining 506 the repeater that corresponds to this matching PMI as the repeater selection for the UE. The eNB also comprises means for controlling 507 the on and off of the repeaters. This control can be performed in different ways depending on the kind of repeater e.g. (automatic or not), as described above. In FIG. 5 and according to the first embodiment, the means for controlling 507 the on/off of the repeaters comprises means for transmitting 571 an on/off command to the repeater.

Also illustrated in FIG. 5 and according to the first embodiment is the repeater 510. It comprises means for measuring 511 the reference signal from the eNB and means for selecting 512 a pre-coding matrix based on this reference signal. It also comprises means for transmitting 513 the index of this selected pre-coding matrix (PMI) to the eNB. This PMI can then be used by the eNB to determine the repeater selection of an UE. Furthermore, the repeater comprises means for receiving 514 an on/off command from the eNB and means for turning on and off 515 depending on the command.

Figure 6:
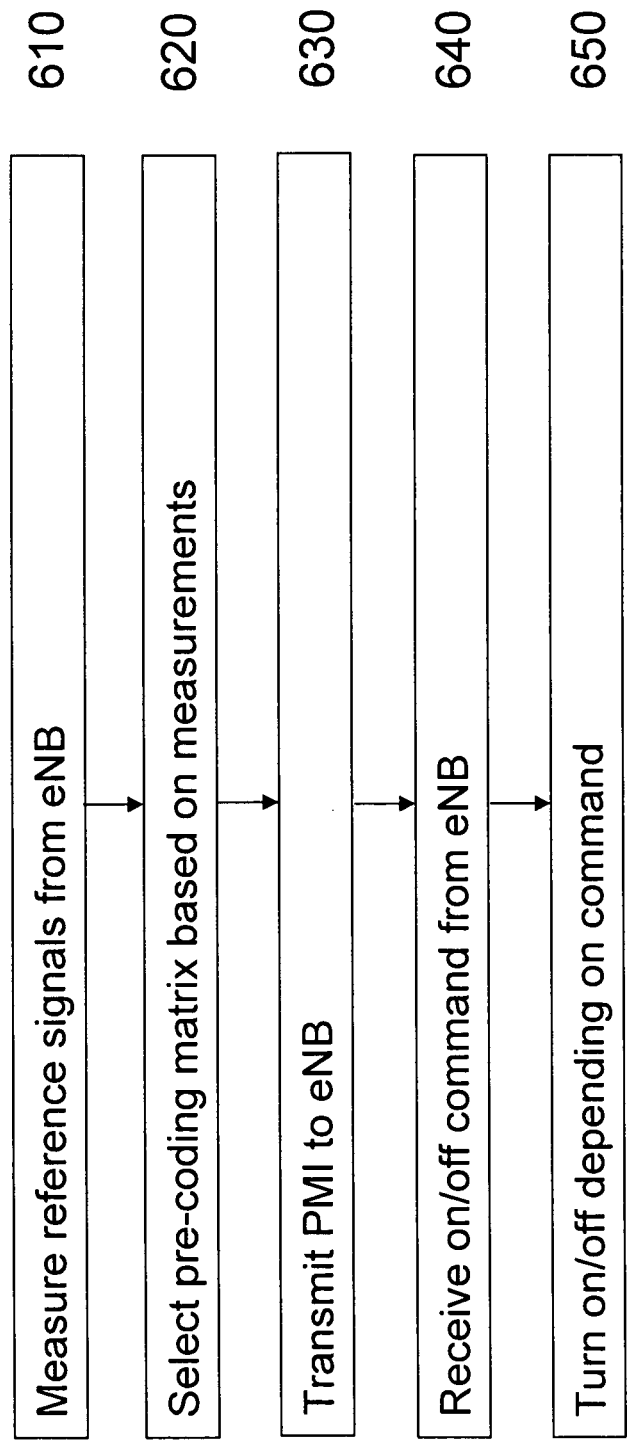
FIG. 6 is a flowchart of the method for the repeater according to embodiments of the present invention.

FIG. 6 is a flowchart of the method for the repeater, according to the first embodiment described above of the present invention. It comprises the steps:

610. Measure reference signals from the eNB.
   620. Select a pre-coding matrix based on the measured reference signals.
   630. Transmit an index of the selected pre-coding matrix to the eNB. The index is used by the eNB to determine the repeater selection for a user equipment.
   640. Receive an on or off command from the eNB.
   650. Turn the retransmission on or off depending on the received command.

Figure 7:
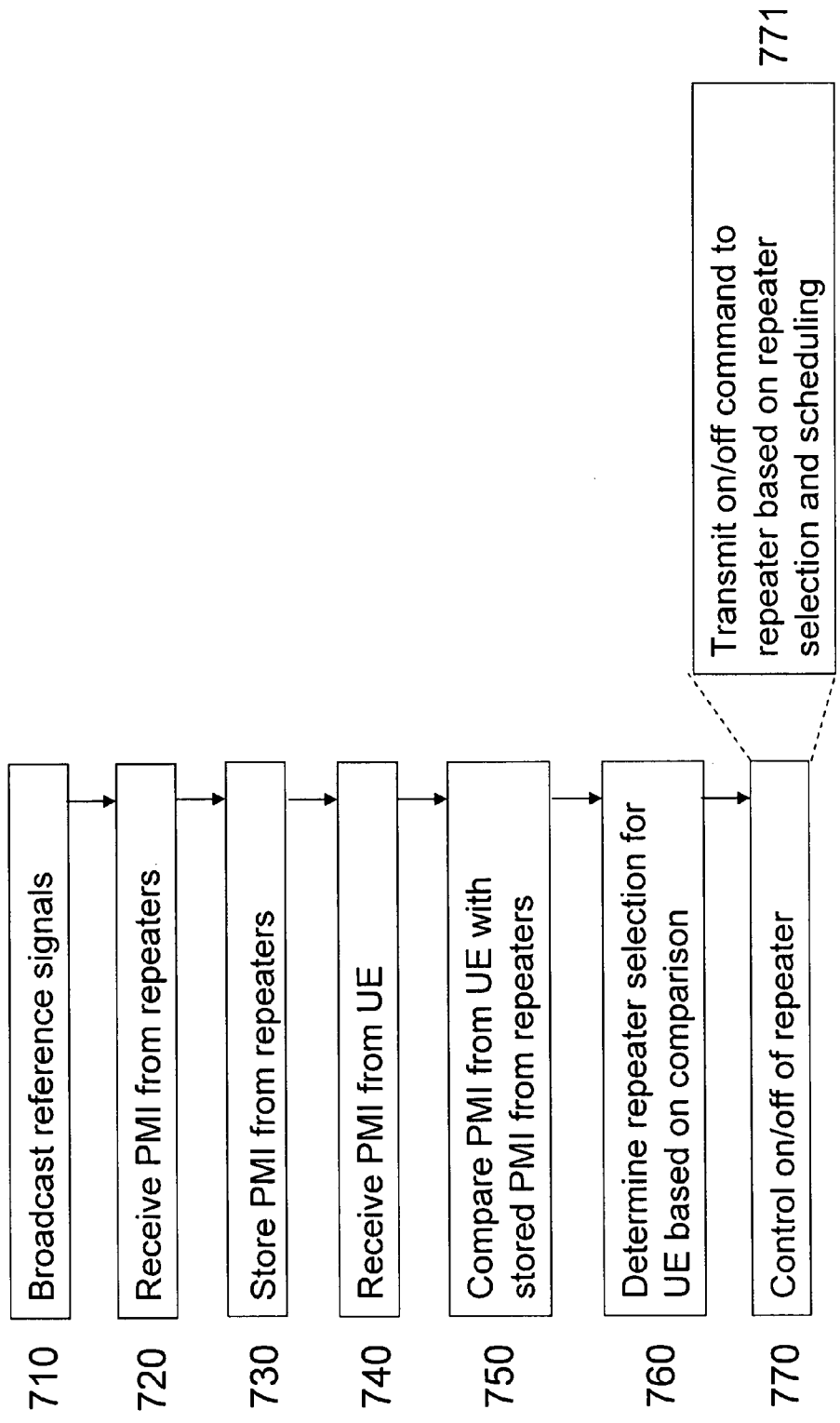
FIG. 7 is a flowchart of the method for the eNB according to embodiments of the present invention.

Furthermore, FIG. 7 is a flowchart of the method for the eNB, according to the same first embodiment of the present invention. It comprises the steps:
710. Broadcast reference signals that are used by the repeaters and the UEs to select the pre-coding matrix.
720. Receive a pre-coding matrix index from the repeaters.
730. Store the pre-coding matrix indices from the repeaters.
740. Receive a pre-coding matrix index from one of the UEs.
750. Compare the received index from the UE, with the stored indices from the repeaters, and when a stored index from a repeater matches the received index from the UE,
760. Determining the repeater that corresponds to this matching stored index as the repeater selection of this UE.
770. Controlling the on and off of the repeaters.

The method step of controlling 770 the on and off of the repeaters can be done in different ways as described above. In FIG. 7, the step of controlling 770 the repeaters comprises the step:
771. Transmit an on or off command to the at least one repeater based on the repeater selection and the scheduling of the at least one UE.

The above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A method implemented by a radio base station working in a pre-coding mode for repeater selection in a radio access network, wherein the radio base station is configured to use at least one repeater and to serve at least one user equipment, UE, said method comprising
broadcasting reference signals,
receiving one or more pre-coding matrix indices from the at least one repeater,
storing the one or more pre-coding matrix indices received from the at least one repeater,
receiving a pre-coding matrix index from the at least one UE,
comparing the pre-coding matrix index received from the at least one UE with the one or more stored pre-coding matrix indices, and
when a stored pre-coding matrix index matches the pre-coding matrix index received from the at least one UE, determining the repeater that corresponds to that matching index as a repeater selection of the at least one UE.

2. The method according to claim 1, wherein the method further comprises controlling an on and off state of the at least one repeater.

3. The method according to claim 2, wherein said controlling comprises transmitting an on or off command to the at least one repeater based on the repeater selection and scheduling of the at least one UE.

4. The method according to claim 2, wherein the at least one repeater is configured to turn off automatically when a received power level is lower than a threshold, and wherein said controlling further comprises scheduling resources in the time domain based on the repeater selection of the at least one UE.

5. The method according to claim 2, wherein repeater transmission in a sub band of the at least one repeater turns off automatically when a received power level in the sub band is lower than a threshold, and wherein said controlling further comprises scheduling resources in the frequency domain based on the repeater selection of the at least one UE.

6. A radio base station of a radio access network, wherein the radio base station is configured to work in a pre-coding mode, to use at least one repeater, and to serve at least one user equipment, UE, and wherein said radio base station comprises:
a processor and a memory, said memory containing instructions executable by said processor whereby said radio base station is operative to:
broadcast reference signals,
receive one or more pre-coding matrix indices from the at least one repeater,
store the one or more pre-coding matrix indices received from the at least one repeater,
receive a pre-coding matrix index from the at least one UE,
compare the pre-coding matrix index received from the at least one UE with the one or more stored pre-coding matrix indices, to find a repeater with a matching stored index, and
determine the repeater that corresponds to the matching stored index as a repeater selection of the at least one UE.

7. The radio base station according to claim 6, wherein said memory contains instructions executable by said processor whereby said radio base station is further configured to control an on and off state of the at least one repeater.

8. The radio base station according to claim 7, wherein said memory contains instructions executable by said processor whereby said radio base station is configured to control the on and off state by transmitting an on or off command to the at least one repeater based on scheduling of the at least one UE.

9. The radio base station according to claim 7, wherein the at least one repeater is configured to turn off automatically when a received power level is lower than a threshold, and wherein said memory contains instructions executable by said processor whereby said radio base station is configured to control the on and off state by controlling scheduling of resources in the time domain.

10. The radio base station according to claim 7, wherein said memory contains instructions executable by said processor whereby said radio base station is configured to automatically turn off repeater transmission in a sub band of the at least one repeater when a received power level in the sub band is lower than a threshold, and to control the on and off state by controlling scheduling of resources in the frequency domain.

* * * * *